Sept. 3, 1935.  W. B. PARKER  2,012,973
APPARATUS FOR APPLYING INSECTICIDAL OR FUNGICIDAL MATERIAL
Filed June 28, 1932  2 Sheets-Sheet 1
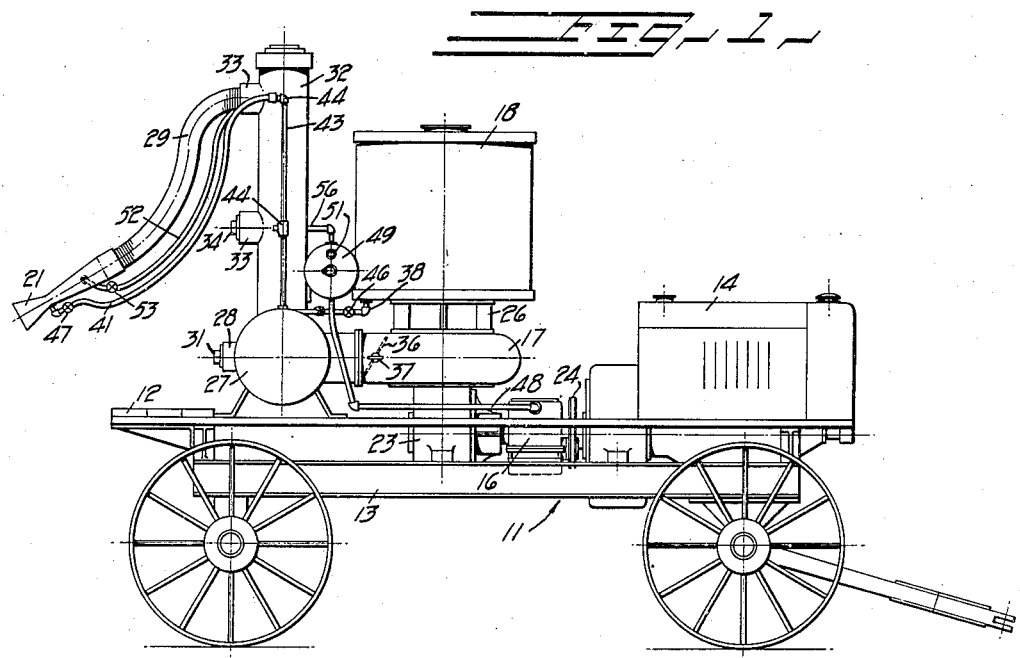
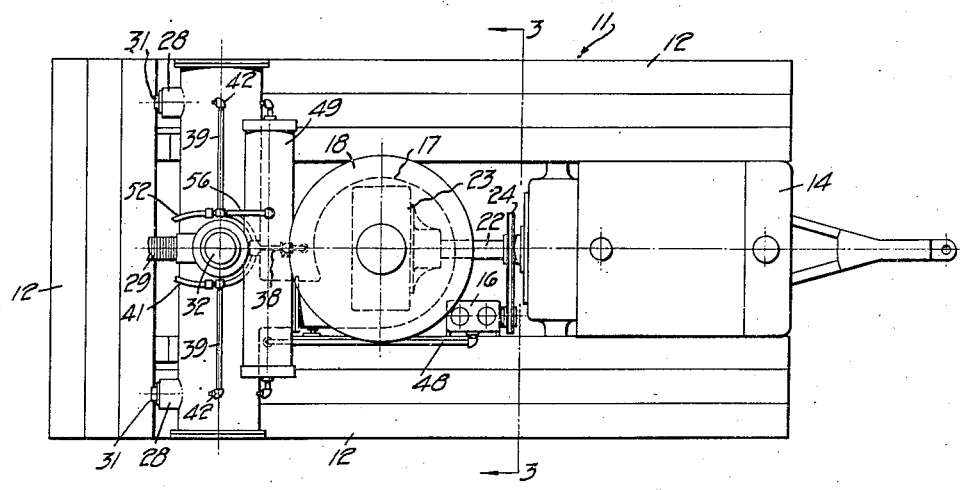
INVENTOR.
WILLIAM B. PARKER
BY
ATTORNEYS.

Sept. 3, 1935.  W. B. PARKER  2,012,973
APPARATUS FOR APPLYING INSECTICIDAL OR FUNGICIDAL MATERIAL
Filed June 28, 1932  2 Sheets-Sheet 2
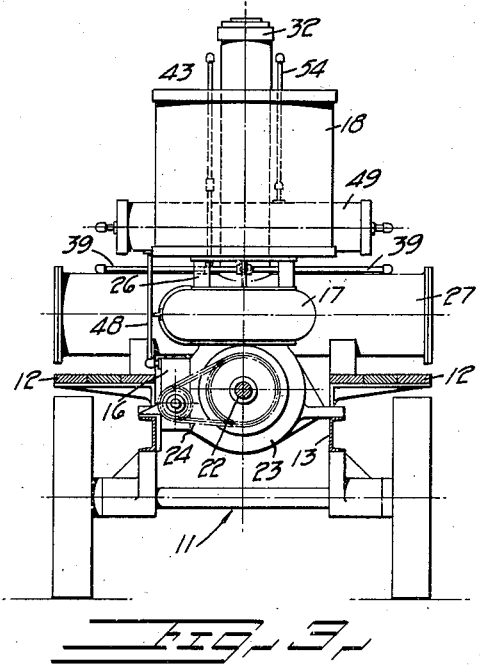
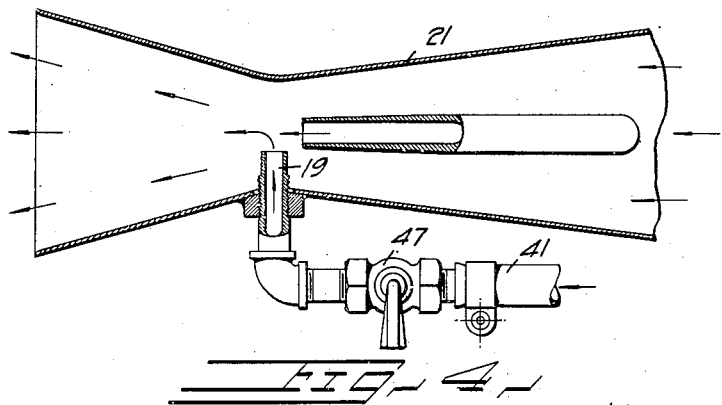
INVENTOR.
WILLIAM B. PARKER
BY
ATTORNEYS.

Patented Sept. 3, 1935

2,012,973

UNITED STATES PATENT OFFICE 2,012,973

APPARATUS FOR APPLYING INSECTICIDAL OR FUNGICIDAL MATERIAL

William B. Parker, Placerville, Calif.

Application June 28, 1932, Serial No. 619,655

4 Claims. (Cl. 299—29)

My invention, in general, relates to the application of materials to diseased or pest-infested growth, and particularly relates to means for simultaneously treating a relatively large number of trees or plants in an area thereof with an effective amount of pest or fungus destructive material.

The apparatus disclosed herein has been designed particularly for carrying out the process described and claimed in my copending application Serial No. 635,861, filed October 1, 1932, and entitled "Method of controlling plant pests and plant diseases".

An object of the invention is the provision of means for effecting the application of insecticidal or fungicidal materials to a plurality of infested or diseased plants in a minimum of time, without waste of materials, and with a minimum of labor and equipment.

Another object of the invention is to provide a portable outfit of the aforementioned character which is readily operable and which is relatively inexpensive to use.

Other objects of the invention, together with some of the advantageous features thereof, will appear from the following description of the prefered embodiment of the invention which is illustrated in the drawings. It is to be understood that, while I have shown the preferred embodiment of the invention in the drawings, I am not to be limited to the form shown, as my invention, as defined in the appended claims, can be embodied in a plurality of forms.

In the drawings:

Figure 1 is a diagrammatic side elevation of an embodiment of the invention.

Figure 2 is a diagrammatic plan of the embodiment of the invention which is illustrated in Figure 1.

Figure 3 is a view of the device taken on the section line 3—3 of Figure 2.

Figure 4 is an enlarged detail of a portion of the embodiment of the invention which is shown in Figure 1.

In its preferred form, the apparatus of my invention preferably comprises means for producing a spray of insecticidal or fungicidal material together with means for enveloping the spray of material in a relatively large volume of rapidly moving air whereby the spray is atomized and diffused and also transformed into a floating, growth-enveloping, fog-like mist containing microscopic particles of the material for direction over and application to diseased or pest-infested growth.

The apparatus, as illustrated in Figures 1 to 3 inclusive, preferably includes a ground vehicle 11, such as a trailer, for attachment to an automotive or other type of ground equipment. The trailer is partially circumscribed with a platform 12 for the convenience of the operator. The several elements for producing a spray of the material, and for transforming the spray into a floating, growth-enveloping, fog-like mist containing microscopic particles of the material, are mounted in compact relationship upon the platform 12 and a frame 13 of the trailer. These several elements include a prime mover 14, preferably a standard gas engine, an air compressor 16, and a blower 17, both driven by the engine. A tank 18 also is included for carrying liquid insecticidal or fungicidal materials, as well as suitable conductors for carrying the material to a nozzle 19, preferably of the well-known paint gun type, and a tube 21 in which the nozzle 19 is disposed and supported and through which air from the blower is caused to move at a relatively high velocity and under a relatively low pressure, together with leads from the air compressor terminating adjacent the orifice of the nozzle 19 and through which air is forced under relatively high pressure whereby the material is aspirated from the nozzle 19 into the air stream flowing through and from the tube 21.

The engine 14 conveniently is mounted upon the frame 13 at one extremity of the trailer and is provided with an extended drive shaft 22 which serves to drive the blower 17 through the medium of suitable gearing, not shown, and a vertical shaft, also not shown, all housed in a gear box 23 carried by the frame. The air compressor 16 is disposed upon the frame 13 at the rear of the engine 14 and preferably is driven from the engine by means of a chain 24 connecting the shaft 22 with the crank shaft of the compressor. Of course, a belt drive can be used for actuating the compressor, if desired. For compactness, I have mounted the blower 17 upon the gear box 23 and have arranged that the tank 18 be rigidly supported upon a platform 26 which is secured to the blower.

While but one tube 21 and its associated nozzle 19 are illustrated in the drawings, it should be understood that the invention contemplates the use and attachment of a plurality of tubes and nozzles with and to the device so that a number of created fog-like mists can be directed over the infested or diseased growth at the will of the operator. Also, it is to be observed that I provide a blower which is capable of delivering air through and from each of the several tubes 21 at a velocity in the neighborhood of 50 to 500 miles per hour under a pressure head of but approximately ¼ to 2 pounds per square inch. Further, a compressor is provided which is of such capacity as to deliver air under a pressure ranging from 30 to 90 pounds per square inch past the orifice of each of the several nozzles 19 whereby the material is aspirated into the air stream flowing through the tube 21.

Suitable conducting means for the air created by the blower 17 are provided and include a header manifold 27 which communicates with the outlet of the blower and which is formed with a plurality of outlets 28. The conducting means also include hoses 29, preferably made of metal, which are provided with suitable connections for attaching the hoses to the tubes 21 and to the outlets 28 of the header manifold. The hoses 29 preferably are flexible in order that the operator of the device can move the same, together with the tubes 21 and supported nozzles 19, at will. A conventional plug 31 can be inserted in any one or more of the outlets 28, in the event it is desired not to utilize the same. I have also provided for the incorporation of a standard 32 in the aforementioned air conducting system in order that the fog-like mists produced by the device may be liberated and directed from elevated positions. The standard communicates with the header manifold 27 and is provided with a plurality of outlets 33 for establishing communication with tubes 21 through the metal hoses 29. The outlets 33 likewise can be closed, when desired, by standard plugs 34. In order that the operator may regulate the air flowing from the blower 17 and through the several tubes 21, I interpose a butterfly valve 36 in the outlet of the blower and connect the same to a control lever 37.

Delivery means for the liquid material from the tank 18 to the several nozzles 19, include a pipe 38 which leads from the tank to a branch pipe 39, together with a plurality of conduits 41, preferably rubber hoses, which lead from the nozzles 19 to outlets 42 formed in the branch pipe 39. In the event that the material is to be supplied to the tubes 21 at elevated positions, a stand-pipe 43, placed in communication with the branch pipe 39, can be utilized, as illustrated in Figures 1 and 3. The stand-pipe likewise is provided with a series of outlets 44 to which the conduits 41 may be connected and conveniently is supported by the standard 32. The outlets 42 in the branch pipe 39 as well as the outlets 44 in the stand-pipe 43 can be closed with suitable plugs, as desired. For regulating the liquid flow, a manually operable control valve 46 is interposed in the pipe 38 and a similar valve 47 also is inserted in each of the conduits 41.

The air delivered under pressure from the compressor 16 is preferably conducted from the compressor by means of a lead 48 to a surge tank 49 which conveniently is mounted upon the standard 32 adjacent the tank 18. The surge tank is a convenient means for storing the air for use as desired, as well as for substantially eliminating the intermittent character of the air flow from the compressor. A relief valve 51 is provided for permitting the escape of air from the surge tank 49 in the event that its capacity is reached before the air therein is utilized. The air preferably is carried from the surge tank to the several tubes 21 by means of flexible conductors 52, in each of which is interposed a manually operable valve 53 for controlling the air flow therethrough. If desired, the flexible conduits 41, carrying the material, and the flexible conductors 52, carrying the air, may be led through a dual control valve, not shown, so that the flow of air from the surge tank and the flow of material from the tank 18 can be simultaneously controlled. I also provide a stand-pipe 54 for conducting the air from the surge tank to tubes 21 that may be used at elevated positions. The stand-pipe 54 communicates with a relatively short pipe 56 connected to the surge tank and conveniently is supported by the standard 32. The stand-pipe 54, of course, is provided with a plurality of outlets so that any one of several flexible conductors 52 may be connected thereto, when desired.

I claim:

1. Apparatus for use in controlling pests or fungi appearing on growth, said apparatus comprising a blower, a prime mover for actuating said blower, a tube through and from which air from said blower is caused to move at a relatively high velocity and under a relatively low pressure, a nozzle supported in said tube, means for supplying liquid insecticidal or fungicidal material to said nozzle, and means including an air compressor driven by said prime mover for causing a jet of air to move past said nozzle under a relatively high pressure whereby the material supplied to said nozzle is aspirated therefrom into the rapidly moving stream of air delivered from said blower and said material is atomized, diffused and carried by said stream of air in the form of a floating, growth-enveloping, fog-like mist containing microscopic particles of said material for direction over said infested or diseased growth.

2. A portable apparatus for use in controlling plant pests or plant diseases, said apparatus comprising a tube, a nozzle supported in said tube, means for delivering liquid insecticidal or fungicidal material to said nozzle, means for causing a stream of air to move through and from said tube at a relatively high velocity and under a relatively low pressure, and means, including an air compressor, for causing a jet of air to flow past the orifice of said nozzle under a relatively high pressure whereby the material delivered to said nozzle is aspirated therefrom and into said stream of air resulting in the liberation of a floating, growth-enveloping, fog-like mist containing microscopic particles of said material.

3. In apparatus for liberating fog-like, growth-enveloping mists containing air and microscopic particles of an insecticidal or fungicidal material, an air blower, a laterally extending manifold having its intermediate portion communicating with the discharge side of said blower, said manifold having a plurality of laterally-spaced outlets, an upright standard communicating with the intermediate portion of said manifold and constituting an extension thereof, said standard having a plurality of outlets arranged at different levels, a flexible air discharge conduit, means for establishing communication between said conduit and any one of said outlets, a tank for holding insecticidal or fungicidal material, and means for introducing atomized particles of said material into the air stream flowing through said conduit.

4. Apparatus for liberating from different levels fog-like growth-enveloping mist containing air and microscopic particles of an insecticidal or fungicidal material, said apparatus comprising a blower, a header manifold communicating with said blower, a standard communicating with and extending from said manifold, said standard having a plurality of outlets arranged at different levels, a tube, a nozzle disposed in said tube, means establishing communication between said tube and said standard through one of said outlets, a tank for holding insecticidal or fungicidal material, means for supplying said material from said tank to said nozzle, and means for directing a jet of air past the orifice of said nozzle to aspirate said material from said nozzle into the air stream flowing through said tube.

WILLIAM B. PARKER.